C. A. Kleeman.

Lamp.

No. 3,900 Reissued Mar. 29, 1870.

Witnesses;
Ernst Preuster
John. L. Mothershead

Inventor;
C. A. Kleeman

United States Patent Office.

CARL A. KLEEMANN, OF ERFURT, PRUSSIA.

*Letters Patent No.* 37,867, *dated March* 10, 1863; *reissue No.* 3,068, *dated August* 4, 1868; *reissue No.* 3,900, *dated March* 29, 1870.

IMPROVEMENT IN LAMPS.

The Schedule referred to in these Letters Patent and making part of the same.

*To all whom it may concern:*

Be it known that I, CARL A. KLEEMANN, of Erfurt, in the Kingdom of Prussia, have invented, made, and applied to use a certain new and useful Improvement in Lamps; and I do hereby declare the following to be a full, clear, and exact description of my said invention, reference being had to the annexed drawing, making part of this specification, wherein—

Similar marks of reference indicate the same parts in both figures.

Figure 1:
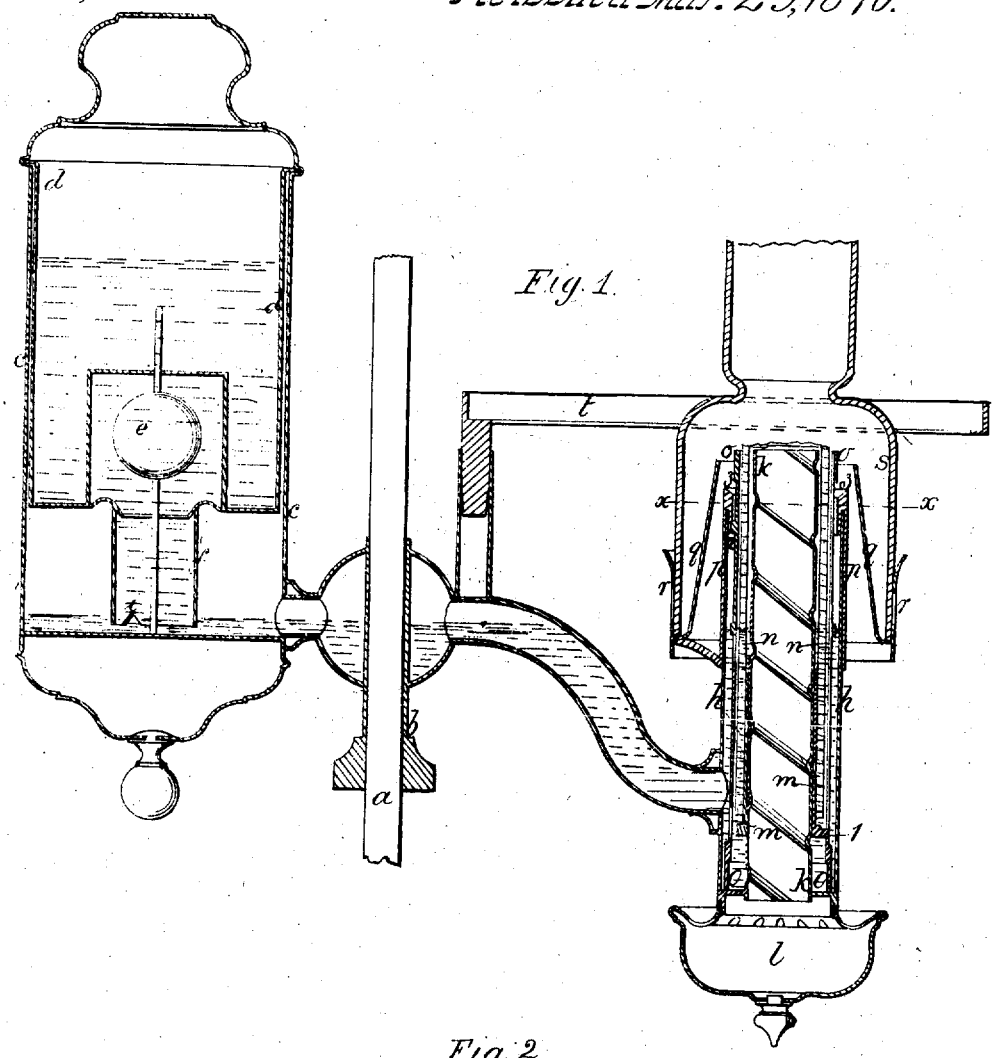
Figure 1 is a vertical section of my said lamp.

My invention relates to a lamp adapted to burning coal-oil, kerosene, or other oils, either pure or mixed with benzine or other material, and relates to an improvement in the construction of the burner, whereby the combustion is rendered more perfect than before my invention, and the risk of heating the lamp or the overflowing of the oil is lessened.

In the drawing—

*a* is a standard, supported by any suitable pedestal; or said lamp may be sustained by any desired means;

*b* is the sleeve on said standard *a*, clamped thereto by a screw, as usual;

*c* is the reservoir; and

*d* is the fountain, provided with the valve *e*, by which the fountain is closed while being inverted and entered into the reservoir, as usual.

The cylinder *f* extends below the orifice for the valve *e*, and has a notch, *i*, at one side of said cylinder, through which the air enters in small bubbles frequently, and the light is not affected by the oil running down.

*g* is a pipe, leading from the reservoir *c* to the burner.

*h* is the outer cylinder, and *k*, the inner cylinder of the burner, united at their lower ends, and receiving the drip-cup *l*.

The inner cylinder *k* is made of sheet metal, and the screw therein is made by bending or compressing said sheet metal, instead of cutting said screw-thread in the metal. The object of this is to get the metal of the burner as thin and light as possible, in order that it may keep cooler, and not conduct heat down to the coal or similar oil.

Around the tube *k* is the wick-holder *m*, carrying the wick *n*, and this holder *m* takes the screw-thread in *k*, so as to raise or lower the wick by the rotation thereof.

*o* is a cylinder outside the wick, with a slot taking the projection 1 from *m*, whereby said wick-holder *m* is rotated.

*p* is a cylinder outside of *h*, and connected with the cylinder *o*.

I have shown the cylinder *p* as extending at the top end slightly down inside the cylinder *h*, and notched, to take the projections 2 for rotating the cylinder *o*.

Around the wick is a flaring or cup-shaped receptacle, 3, that catches any oil that may run down outside of the wick-tube *o*, and returns the same to the lamp, and prevents any overflow.

Figure 2:
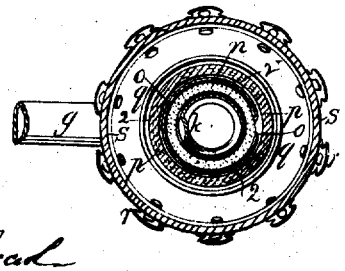
Figure 2 is a sectional plan of the burner at the line *x x*, fig. 1

The chimney-holder *r* is made as a range of springs, (see fig. 2,) receiving the chimney *s*; and this chimney *s* is contracted, forming a neck a short distance above the top of the wick, to concentrate the air upon the flame, and aid in perfecting the combustion.

Within the chimney-holder *r* is the cone *q*, passing up to near the base of the flame, and openings are provided, so that air passes between the chimney *s* and cone *q*.

The chimney-holder, cone, and tube, passing down into the cylinder *h*, are so connected that they turn together, and for this purpose I have shown the arms 5, and there are air-inlets, 4, in the cone *q*, to allow the air to pass between the chimney *s* and cone *q*.

This burner does not become heated to any considerable extent, because the thin sheet metal of which it is composed is largely exposed to the action of the air, and the air is not obstructed as it ascends to the flame through the cone *q*, and the flame is much more uniform than in the lamps where the chimney-holder is suspended by rods.

I claim as my invention—

1. An argand wick-tube and spring chimney-holder, in combination with the cone *q*, and openings to admit air to pass between the cone and the glass chimney, substantially as set forth.

2. The argand wick-raising mechanism, to regulate the height of flame, in combination with the cone, spring chimney-holder, and air-inlets between the chimney and cone, to direct air upon the flame, substantially as set forth.

3. The spring chimney-holder, cone *q*, and openings to admit air between the cone and chimney, in combination with a chimney having a contracted neck, substantially as set forth.

Dated this 4th day of January, A. D. 1870.

C. A. KLEEMANN.

Witnesses:

DR. DITTRICH,

H. J. WINSER.